(12) United States Patent
Bouilloux-Lafont et al.

(10) Patent No.: US 7,743,096 B2
(45) Date of Patent: Jun. 22, 2010

(54) CREATION OF A CHAT ROOM FOR TELEVISION NETWORK

(75) Inventors: Héléne Bouilloux-Lafont, c/o Thompson Licensing S.A., 46 Quai A. Le Gallo, 92100 Boulogne-Billancourt (FR); Issam Aglan, c/o Thompson Licensing S.A., 46 Quai A. Le Gallo, 92100 Boulogne-Billancourt (FR); Hervé Lemaitre, c/o Thompson Licensing S.A., 46 Quai A. Le Gallo, 92100 Boulogne-Billancourt (FR); Emmanuel Tessier, Boulogne-Billancourt (FR)

(73) Assignees: Thomson Licensing S.A., Boulogne-Billancourt (FR); Hélène Bouilloux-Lafont, Vanvess (FR); Issam Aglan, Nantes (FR); Hervé Lemaitre, Cagnes sur Mer (FR)

( * ) Notice: Subject to any disclaimer, the term of this patent is extended or adjusted under 35 U.S.C. 154(b) by 971 days.

(21) Appl. No.: 10/511,772

(22) PCT Filed: Apr. 22, 2003
(Under 37 CFR 1.47)

(86) PCT No.: PCT/EP03/50120
§ 371 (c)(1),
(2), (4) Date: Oct. 12, 2006

(87) PCT Pub. No.: WO03/092289
PCT Pub. Date: Nov. 6, 2003

(65) Prior Publication Data
US 2008/0320085 A1 Dec. 25, 2008

(30) Foreign Application Priority Data
Apr. 23, 2002 (EP) .................................. 02291020

(51) Int. Cl.
*G06F 15/16* (2006.01)
*H04N 7/08* (2006.01)
*H04N 7/173* (2006.01)

(52) U.S. Cl. .......................... 709/204; 725/135; 725/86

(58) Field of Classification Search ................. 709/204, 709/220–229, 246; 370/270, 465, 477, 351–358, 370/408, 60; 348/211–215, 207; 705/1–5; 725/34–45, 80–101
See application file for complete search history.

(56) References Cited

U.S. PATENT DOCUMENTS

| 5,793,365 A * | 8/1998 | Tang et al. .................. 715/758 |
| 6,545,722 B1 * | 4/2003 | Schultheiss et al. ......... 348/552 |
| 2003/0078972 A1 * | 4/2003 | Tapissier et al. ............ 709/204 |
| 2003/0101450 A1 * | 5/2003 | Davidsson et al. ............ 725/32 |

FOREIGN PATENT DOCUMENTS

| EP | 1 091 582 A2 | | 4/2001 |
| WO | WO 00/13416 | | 3/2000 |
| WO | WO 00/39978 | | 7/2000 |
| WO | WO 200039978 | * | 7/2000 |
| WO | WO 01/24092 | | 4/2001 |
| WO | WO 01/50753 | | 7/2001 |

* cited by examiner

*Primary Examiner*—Nathan Flynn
*Assistant Examiner*—Mark O Afolabi
(74) *Attorney, Agent, or Firm*—Osha • Liang LLP (57) ABSTRACT

A chat system for a digital television network comprises a digital operator head end system for broadcasting to subscriber decoders. The head end system comprises a chat room creation device which communicates with a chat server to create, cancel and/or join an event related chat room, a trigger device which may be programmed to activate itself at the occurrence of an event and automatically sends a request for creation of a chat room to the chat room creation device, a broadcast device used for preparing a transmission of information to the subscriber decoders, and a notification server to generate a notification message to be transmitted by the broadcast device, the notification message being related to the creation of an event related chat room.

26 Claims, 9 Drawing Sheets

CREATION OF A CHAT ROOM FOR TELEVISION NETWORK

FIELD OF THE INVENTION

The invention relates to a television network system and more particularly to a messaging services enabling television subscribers to receive and exchange messages in the frame of a chat system.

BACKGROUND OF THE INVENTION

The electronic real time exchange of messages, commonly known as "Chat", is a widespread multi-user system, which allows users to remotely join into public or private discussions (Chat rooms). A chat room may in effect be displayed on a visual display device. Users may choose to participate, create and/or animate a chat room.

The users of the Chat system generally connect to a network comprising Chat servers. A user interface is commonly provided by a Chat client running on a personal computer. The user is offered a choice of chat rooms which may be identified by their discussion topics. The user may then either be invited to one of the available chat rooms, or request the server to let him join a determined chat room.

Known Chat services are commonly accessible through the internet network, and are accessed by means of chat clients that are specific to the available operating systems or may be executed by means of an internet browsing application under those operating systems.

Another way to access chat systems is currently available through digital television networks. A digital television network allows a digital television provider to broadcast information from a head end to subscribers. Each subscriber receives and decodes the information using a decoder in order to obtain and visualize corresponding services on his television set. The transmission of information may be done by way of terrestrial, satellite or cable network transmission.

The broadcast information generally comprises a plurality of services such as television programmes. A television programme typically gathers a video and/or an audio stream which may be understood as service components. Further service components may be data associated to the service.

The digital television network may provide a return link to return information from a subscriber to the digital television provider. The return link may be implemented in some cases through the network itself or else using a separate link such as for example a telephone connection established between the decoder and the provider by means of a telephone modem.

In order to implement a chat system in a digital television network, the subscriber is required to execute a chat client application on his decoder which processes the information received from the chat server and generates an appropriate display. The subscriber interacts with the chat client application and may select to join a chat room or any other option offered by the chat system. The subscriber's action is transmitted to the chat server through the return link. Hence the functionality offered by this digital television chat system is very similar to the functionalities known from the chat systems accessible over the Internet. In some instances, a chat server may be connected to a television network and Internet at the same time, and allow television subscribers to meet Internet clients in chat rooms.

The described chat systems use chat clients in which it is generally assumed that the user has a way to transmit information to the chat server either through the network or any other return link.

One particularity in television networks is that while the subscriber may permanently be able to receive information from the head end by way of broadcast, the return link may not necessarily be permanent. This is for example generally the case if the return link is established through a telephone connection.

Another particularity in television networks is that there may be specific services and programmes broadcast that may be subject to chat rooms.

SUMMARY OF THE INVENTION

In a first aspect the invention provides a chat manager system for administrating an event-related chat room, the chat manager system comprising
   a chat room creation device which communicates with a chat server to perform at least one function selected from the group consisting of creating, cancelling and joining a chat room, and
   a trigger device which is programmed to activate itself at the occurrence of an event and automatically sends a request for creation of a chat room to the chat room creation device.

Appropriately the chat manager system further comprises a scheduler device to maintain a playlist of events, each event being associated to at least one of following event information items:
   identification of event provider,
   name of event,
   begin time,
   end time,
   name of chat room,
   topic of chat room, The scheduler device is interfaced to the trigger device to program the trigger device according to event information of the playlist.

Appropriately the request for creation includes event information.

Appropriately the chat manager system comprises a notification system adapted to generate a notification signal intended to notify a potential user of the created chat room.

Appropriately the chat manager system comprises a discussion transmission device which receives chat room data from the chat server corresponding to exchanges between users connected to the created chat room, and forwards the chat room data to potential users of the created chat room In a second aspect the invention provides a digital television operator head end system for broadcasting services to subscriber decoders, comprising a chat manager system.

Appropriately the head end system comprises a broadcast device used for preparing a transmission of information to the subscriber decoders and a notification server interfaced with the chat manager to generate a notification message to be transmitted by the broadcast device. A service plan device interfaced with the chat manager provides a service number corresponding to the event, the service number being used by the notification server to generate a notification message for the concerned service only.

Appropriately the head end system comprises a programming server interfaced with the chat manager to allow a distant access for programming.

In a third aspect the invention provides a chat system for a digital television network comprising a digital television operator head end system and a least a decoder for receiving and decoding services broadcast by the digital television operator. The decoder comprises a chat client.

In a fourth aspect the invention provides a chat system for a digital television network comprising a digital operator head end system for broadcasting to subscriber decoders. The digital operator head end system comprises a chat room creation device which communicates with a chat server to create, cancel and/or join an event related chat room, a trigger device which may be programmed to activate itself at the occurrence of an event and automatically sends a request for creation of a chat room to the chat room creation device. The head end system further comprises a broadcast device used for preparing a transmission of information to the subscriber decoders, and a notification server to generate a notification message to be transmitted by the broadcast device, the notification message being related to the creation of an event related chat room.

Appropriately the chat system comprises a scheduler device to maintain a playlist of events, each event being associated to at least one event information item selected from the group of:

identification of event provider,
name of event,
begin time,
end time,
name of chat room,
topic of chat room.

The scheduler device is interfaced to the trigger device to program the trigger device according to event information of the playlist.

Appropriately an event may be related to a television programme and the chat system comprises a service plan device to provide a service number corresponding to a service on which the television programme is broadcast to the subscribers. The service number is used by the notification server to generate a notification message for the concerned service only.

In a fifth aspect the invention provides a method for administrating event related chat rooms in a digital television network, comprising maintaining a playlist of events and related information, and automatically requesting a chat server to create an event related chat room on occurrence of an event of the playlist.

Appropriately the method comprises receiving information to be broadcast from a content provider and detecting in the information to be broadcast a determined information corresponding to an event of the playlist. On detecting the determined information, a chat server is automatically requested to create an event related chat room.

Appropriately the method comprises notifying potential users of a newly created event related chat room about its creation.

Appropriately the method further comprises relating an event with a television programme, identifying a service number used to broadcast the television programme in the television network, using the service number to notify potential users.

In a sixth aspect the invention provides a chat manager system for providing passive access to a chat room for subscribers in a digital television network, the chat manager comprising at least an interface to a chat manager for receiving chat room data related to a chat room currently opened on the chat server, and broadcasting means for formatting and broadcasting the chat room data to the subscribers.

Appropriately the chat manager system comprises a buffer to store chat room data for delayed broadcast by the broadcasting means.

In a seventh aspect the invention provides a method for providing passive access to at least one of a plurality of chat rooms for subscribers in a digital television network, comprising gathering chat room data related to the chat room from a chat server on which the chat room is opened, and broadcasting the gathered chat room data to the subscribers.

In an eight aspect the invention provides a decoder for receiving and processing services broadcast by a digital television operator head end system, comprising display means to display discussion data from a chat room on a television screen, the discussion data appearing at the same time as a determined service currently being broadcast and displayed.

Preferably the decoder comprises a pop-up display means that generates a pop-up window on the television screen containing a notification about the creation of an event related chat room.

Preferably the decoder comprises connection means to establish a return link between the decoder and the chat server, the return link being used to send discussion data from the decoder to the chat server.

Appropriately the return link is used as a bi-directional link that allows to receive discussion data from the chat server.

Appropriately the decoder comprises MPEG filtering means for filtering the determined service among the services being broadcast according to filtering parameters, the filtering means being connected to the pop-up display means, and the filtering parameters being used to activate the pop-up display means if the creation of the event related chat room is related to the determined service.

In a ninth aspect the invention provides a decoder for receiving and processing chat room data in a digital television network, comprising a notification component that receives and processes a notification signal generated by a chat manager system, and pop-up display means that display a pop-up window containing the notification signal on a television screen.

BRIEF DESCRIPTION OF THE FIGURES

The invention will now be described in greater detail with reference to the accompanying drawings, in which FIG. 1 contains a flow chart illustrating an administration of chat room according to the invention.

DESCRIPTION OF THE PREFERRED EMBODIMENTS

General Overview

The present invention relates to using chat rooms in conjunction with events such as television programmes. In some instances, a content provider operating on the broadcaster's transmission end may decide to create an event related chat room. A chat programming tool allows to schedule the creation of a chat room associated to a determined programme. The scheduled chat system triggers a notification system at a date and time corresponding to the determined programme. The notification system notifies the decoders about the creation of the event related chat room. A subscriber is notified on his television screen through his decoder about the creation or about the existence of the event related chat room.

One example of use for the present invention is for a soccer match. The subscribers are notified at the beginning of the match about the creation of a chat room related to the match. Hence the subscribers may choose to join the chat room and exchange comments about the match.

A further example of use concerns the end of a programme. While watching the end of the programme, the subscribers are notified about the creation of a chat room in which subscribers may join a debate concerning the programme.

In yet another example of use, the subscriber is notified of an existing chat room, at the moment when the subscriber switches to a determined programme for which a chat room was created. This is for example the case when the subscriber switches to an ongoing broadcast of a soccer match for which a chat room was created. The subscribers needn't watch the match from the beginning to be notified about the chat room.

Advantageously a subscriber may be notified again about the existence of a chat room when he decides to switch back to a programme for which a chat room was created, after having been watching another programme. Although the subscriber had been notified a first time while watching the programme for which a chat room was created, the subscriber is notified again when he comes back to this programme after having temporarily watched another programme.

Following the notification, the subscriber may choose to join the chat room and participate in the exchange of messages. Alternatively the subscriber may choose to only receive the messages exchanged in the chat room. The subscriber may also decline any interest for the chat room.

Creation and Notification of an Event Related Chat Room

Figure 1:
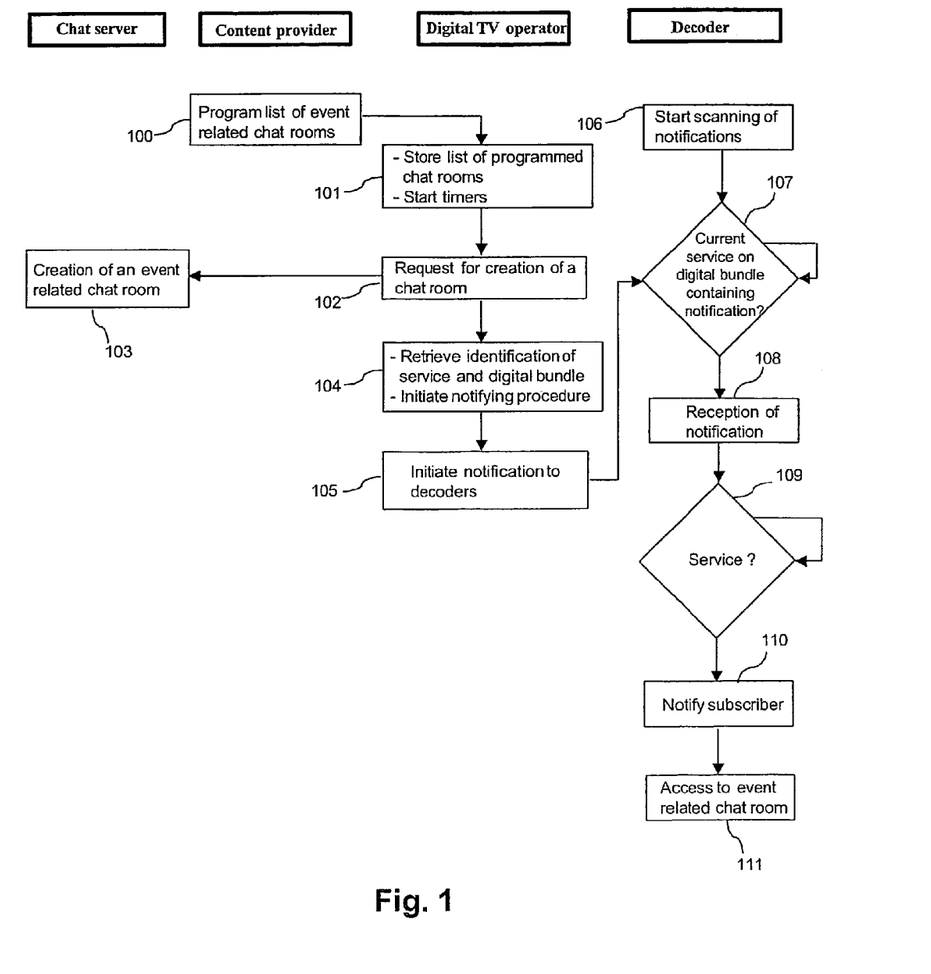

FIG. 1 contains a flow chart which illustrates the administration of event related chat rooms. The flow chart has four columns which each represent an entity in a digital television chat system. The chat server column contains steps implemented at the chat server. The steps for actually implementing and operating a chat room as such are well known to a person of the art and, therefore, these steps are not shown in the chat server column. The further columns contain steps to be implemented respectively by the content provider, the digital television operator and at the receiving decoder which belongs to a subscriber. In box 100 the content provider programs a list of event related chat rooms. This may for example be done through a graphical user interface which allows the content provider to input a description of a chat room and then link the description to an event, such as a programme, and more precisely to a particular date and time. The programmed list of events is sent to the digital television operator, who at box 101 stores the list.

An alternative method of programming may be to provide chat room information such as a list of events together with contents provided to the digital television operator (not shown in FIG. 1).

At the same time at least a timer corresponding to the items in the list of events is started. As soon as an event in the list occurs, i.e., when the date and time of a programmed event is reached, the corresponding timer triggers a request for creation of a chat room in box 102. The request is sent to the chat server that creates the event related chat room as appropriate in box 103.

Following the request in box 102, the identification of a service and of a digital bundle carrying the service associated to the event related chat room are retrieved from the list, and a procedure for notifying of the decoders initiated in box 104. The procedure for notifying initiates a notification mechanism in box 105, whereby a notification is broadcast to the chat clients in the decoders. The broadcast may for example be one shot or periodic.

An alternative method of triggering a request for creation of a chat room may be to detect a determined information occurring in the contents provided by the digital television operator instead or in addition to the triggering of the timer. The determined information may for example be a message, a picture, a sound or any other signal contained in the contents provided to the digital television operator. Such an alternative method of triggering enables for example to detect a picture inserted by the content provider at the beginning of a television programme and hence to detect the beginning of the programme broadcast. The detection of the picture triggers a request for creation of a chat room. Following the request a procedure for notifying of the decoders is initiated. The determined information may be related to an event contained in the list of events.

On the decoder side, a scan for notifications contained in the received and decoded signals is started in box 106. A loop in box 107 checks whether the service currently selected in the decoder is contained in the same digital bundle containing the notifications. Once the appropriate digital bundle has become available, the notification may be received in box 108.

In the present example the subscriber wants to be notified of the event related chat room only if he selects the related service. Therefore it is compared in box 109 if the currently selected service is the same as the service to which the notification relates. If this is the case the subscriber is notified in box 110. The notification may for example be a banner which pops-up on the display and informs the subscriber about the chat room by means of a written message. Alternatively the notification could also be a blinking graphic on the screen or an acoustical signal.

It is understood that a person skilled in the art could modify the present example in order to notify a subscriber about a chat room for certain services, even if the subscriber hasn't currently selected the concerned services.

The present example may include an option according to which the subscribers chooses not to be notified at all (not shown in FIG. 1).

The subscriber is given at least one or more of the following choices in box 111:

Join the discussion: the chat client application is executed and a connection to the chat server via a return link is established. The user automatically enters the chat room and starts participating to the discussion. The information from the chat server concerning the chat room may for example either be broadcast through the digital television operator or transmitted back using the established return link;

Visualize the discussion: the chat client application is executed but no connection to the chat server needs to be established. The discussion of connected participants is displayed on the subscriber's television;

Ignore: the subscriber returns to the currently selected service. As long as the subscriber remains on this service, he will not receive any further notification; if the subscriber leaves and later returns to the service, he will again receive the notification; if the later was programmed for periodical broadcast.

Visualizing a Discussion Without Establishing a Return Link

Figure 2:
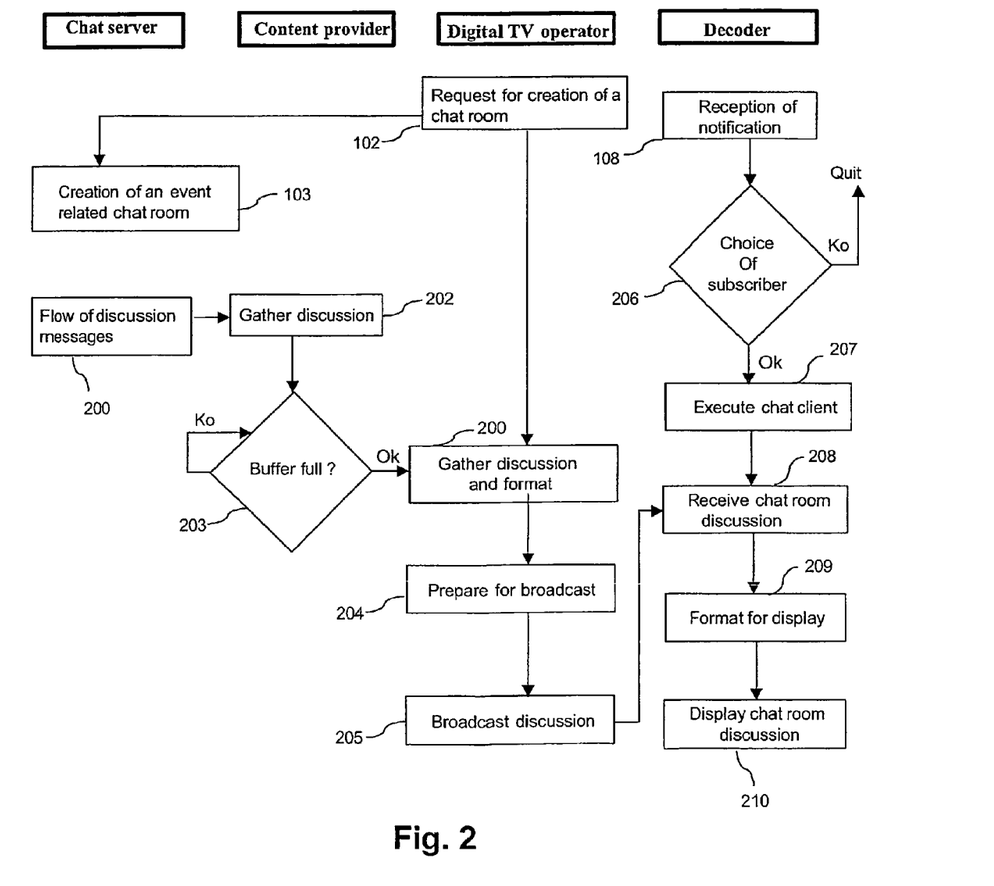
FIG. 2 contains a flow chart illustrating a visualization of a chat room discussion according to the invention.

FIG. 2 contains a flow chart which illustrates the steps for visualizing a discussion from a chat room on the subscriber's screen without actually being connected to that chat room through a return link between the decoder and the chat server. The flow chart contains 4 columns in a similar way as in FIG. 1 corresponding to steps taken respectively on the Chat server, from the content provider, the digital television operator and on the decoder. The boxes 102, 103 and 108 correspond to the boxes having the same reference numbers in FIG. 1.

The process illustrated in FIG. 2 is initiated in case the subscriber chooses to visualize the discussion only. Since no connection through a return link is established the discussion of the selected chat room is broadcast from the chat server to the decoder.

Once the creation of an event related chat room in box 103 has been requested in box 102, the discussion of that chat room is gathered and formatted for broadcast in box 200. Prior to the gathering a flow of messages representing the discussion in the chat room in box 201 is transmitted to the content provider in box 202. The discussion messages are buffered in an appropriate buffer memory as represented in box 203, and transmitted to the digital television operator in box 200 to be broadcast. The transmission of the buffered messages may for example occur once the buffer is filled, or in a periodical fashion.

In an alternative embodiment of the invention, the boxes 202 and 203 may well be located in another column of the flowchart, e.g., they may located in the column corresponding to the digital television operator.

The gathered and formatted discussion messages are prepared for broadcast in box 204. This may for example be the insertion of the messages in tables in case the digital television operator uses a packetized broadcast of data, such as the commonly known MPEG packets. The table is dedicated to the discussion in the chat room. The messages are subsequently broadcast as shown in box 205, as part of the digital bundle that also contains the service to which the chat room is related.

The subscriber receiving the notification on his decoder in box 108 either chooses to visualize the discussion of the chat room or selects to ignore the chat room in box 206. In the latter case the decoder returns to the currently selected service. In the former case the chat client application is executed to enter the chat room in box 207. However, no connection through a return link is established to the chat server and hence the subscriber won't appear as a connected participant in the chat room.

The messages corresponding to the discussion in the chat room and broadcast by the digital television operator are identified and received in box 208. Generally the messages are periodically broadcast and received by the chat client application. In case the messages were inserted in tables, these are filtered and processed to extract the messages. The received information is processed and formatted for display in box 209 before being sent to display in box 210.

In a preferred embodiment the subscriber may only continue to visualize the discussion of the chat room as long as he remains on the corresponding service.

In another preferred embodiment (not shown), a similar process enables a chat client to display permanently broadcast information originating from one or more chat servers. This may be part of a specific dedicated service and need not be related to any specific event or notification. The television operator permanently broadcasts specific information, such as lists of available chat rooms including for example their topics, or the number of users connected in a chat room. The subscriber may at first check the display of his chat client and decide whether the desired chat room is available and perhaps if the number of users connected is sufficient. Optionally the subscriber may establish a return link to the chat server and enter the desired chat room for a discussion with the connected users In yet another embodiment the head end additionally broadcasts commercial banners to be displayed in dedicated areas of the chat client's display.

Content Provider's User Interface

Figure 3:
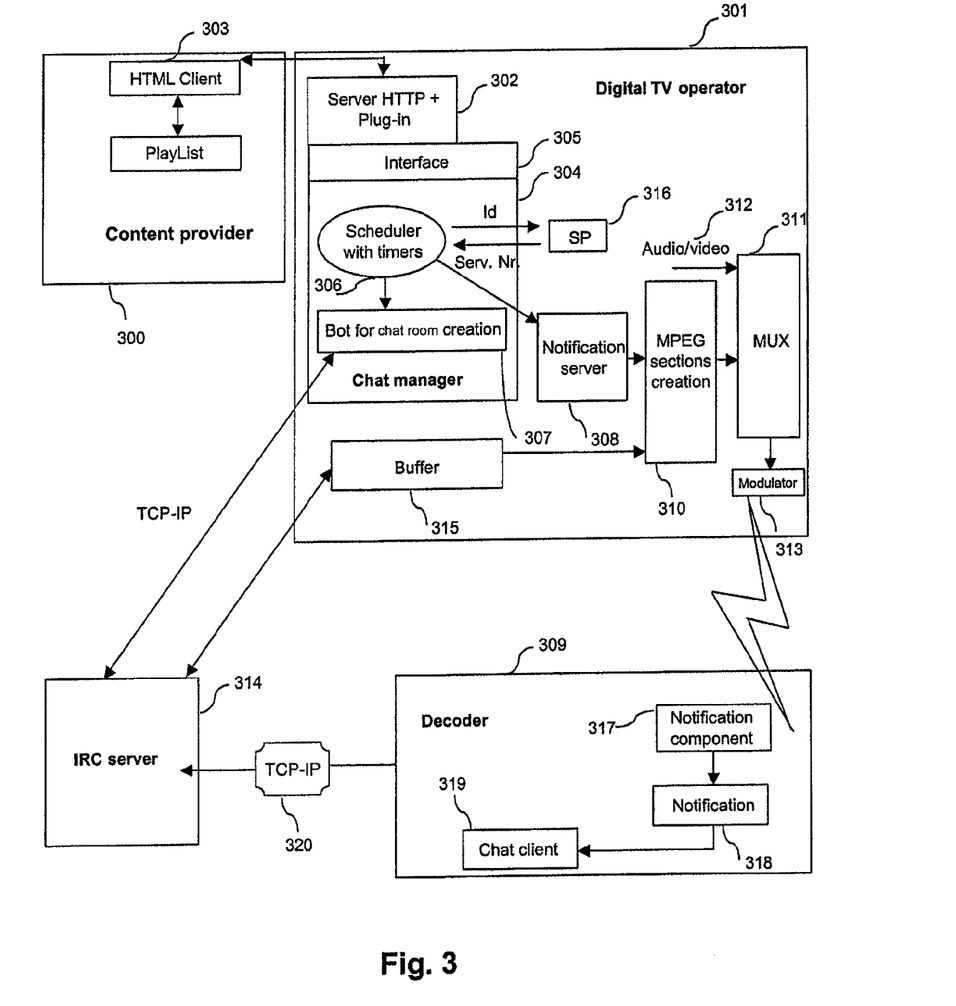
FIG. 3 gives a schematic overview of a chat system according to the invention.

Referring to FIG. 3 a schematic representation of the television operator and the chat system is shown.

A content provider 300 communicates with a digital television operator 301 through a server 302. In the present embodiment the content provider 300 uses an HyperText Markup Language (HTML) client application 303 to access the server 302 which may be a HyperText Transfer Protocol (HTTP) server. The server 302 uses a plug-in extension to enable communication with a chat manager 304 via an interface 305 of the chat manager.

Generally the content provider 300, or any other partner working on behalf of the content provider, will be required to identify himself with the chat manager using an identification and a password. Once the identification is accepted the server 302 transmits a user specific HTML page to the client application 303. The HTML page may for example be used to access and visualize a playlist of currently scheduled chat rooms that have been programmed, and to modify the playlist.

The content provider 300 may send to the server 302 a request for creation of a chat room or modification of an existing playlist by indicating the concerned service which will be broadcast, the date, the begin and end time for opening the chat room, and the name and/or topic of the chat room. After communicating with the chat manager 304, and more precisely with a scheduler 306, the server 302 informs the client application 303 if the request is erroneous or rejected, and allows to visualize and update view of the playlist.

In the present embodiment it appears obvious that communication between client application 303, server 302 and chat manager 304 uses the well known TCP-IP protocol. Therefore it is possible that each communication partner may be located at distant locations from each other. More precisely it is possible to have the server 302 and the scheduler 306 of the chat manager 304 implemented on a single or on distinct computers.

Scheduler

The scheduler 306 may for example be a process which is executed in the frame of the chat manager 304. The scheduler 306 has access to a memory (not shown in FIG. 3) of the chat manager, in which it stores identification information about authorized users, i.e., content providers, and playlist data.

While processing a request for creation of a chat room, the scheduler 306 sets a timer according to the date and time of the new event-related chat room. The timer will activate the scheduler 306 at the programmed date and time.

Figure 4:
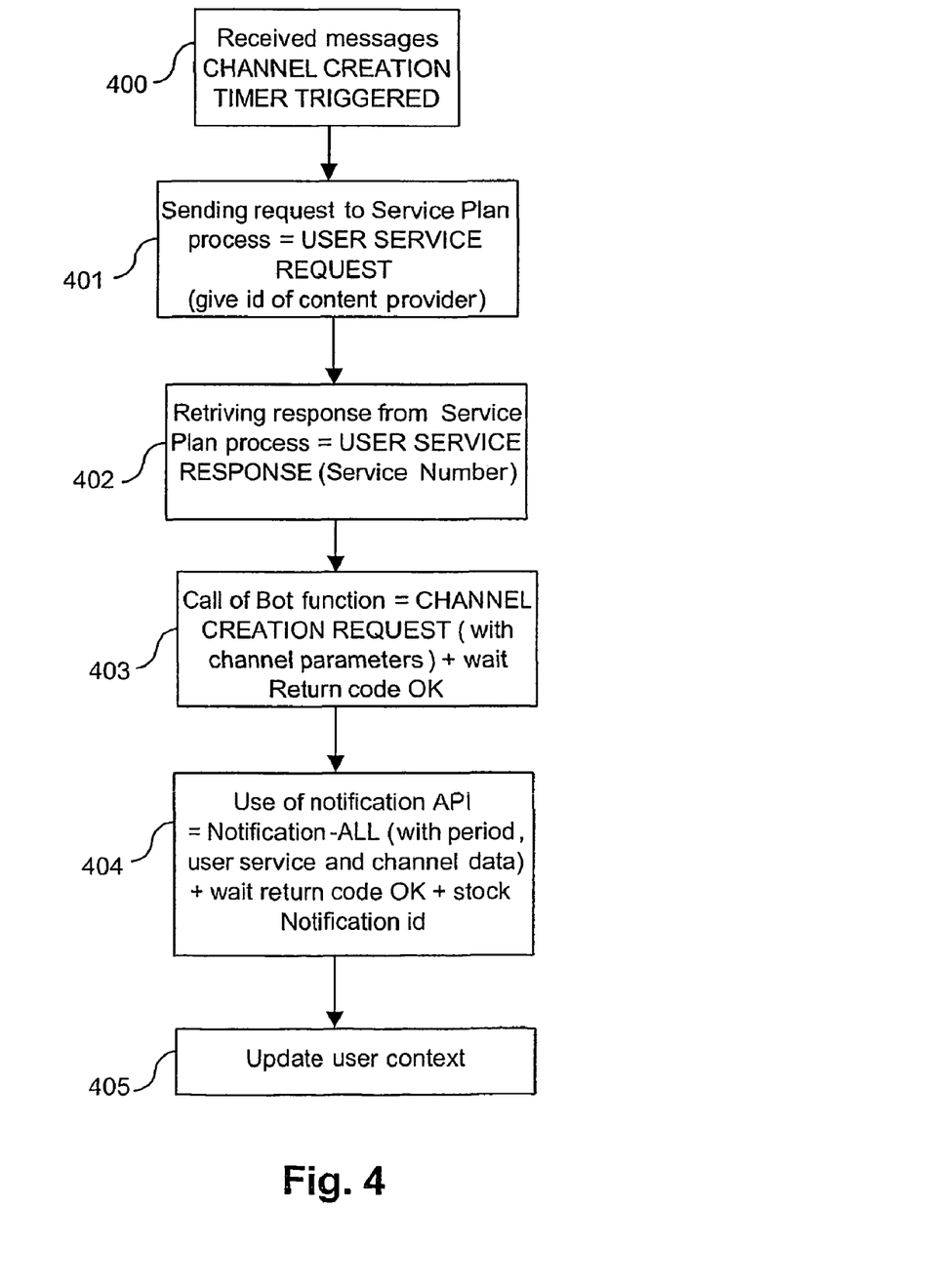
FIG. 4 shows a flow chart illustrating an operation of a scheduler according to the invention.

Referring to a flow chart in FIG. 4, the activation of the scheduler 306 by the timer in box 400, for a chat room creation leads to at least the followings actions:

Send a request 401 to a service plan process from the digital television operator and retrieve a service number corresponding to the identification of the content provider who programmed the chat room request (402). This is also represented at reference sign 316 in FIG. 3. The service plan is maintained by the digital television operator and generally gives and overview of the current and planned services.

Send a request 403 to a chat room creation Bot in order to actually create the chat room, and submitting information relating to the name and/or topic of the chat room. Subsequently, the scheduler receives a response from the Bot in order to know if the chat room has been created. The Bot is also represented at reference 307 in FIG. 3, and corresponds to a process of the chat manager 304, which communicates with an Internet Relay Chat server 314 (IRC server). This will be described in more detail in a dedicated section.

Once the creation of the chat room has been accomplished, the scheduler communicates (404) with a notification server (reference 308 in FIG. 3) in order to notify the decoders on the subscriber's receiving side about the creation of the chat room.

Update the playlist data (405).

Figure 5:
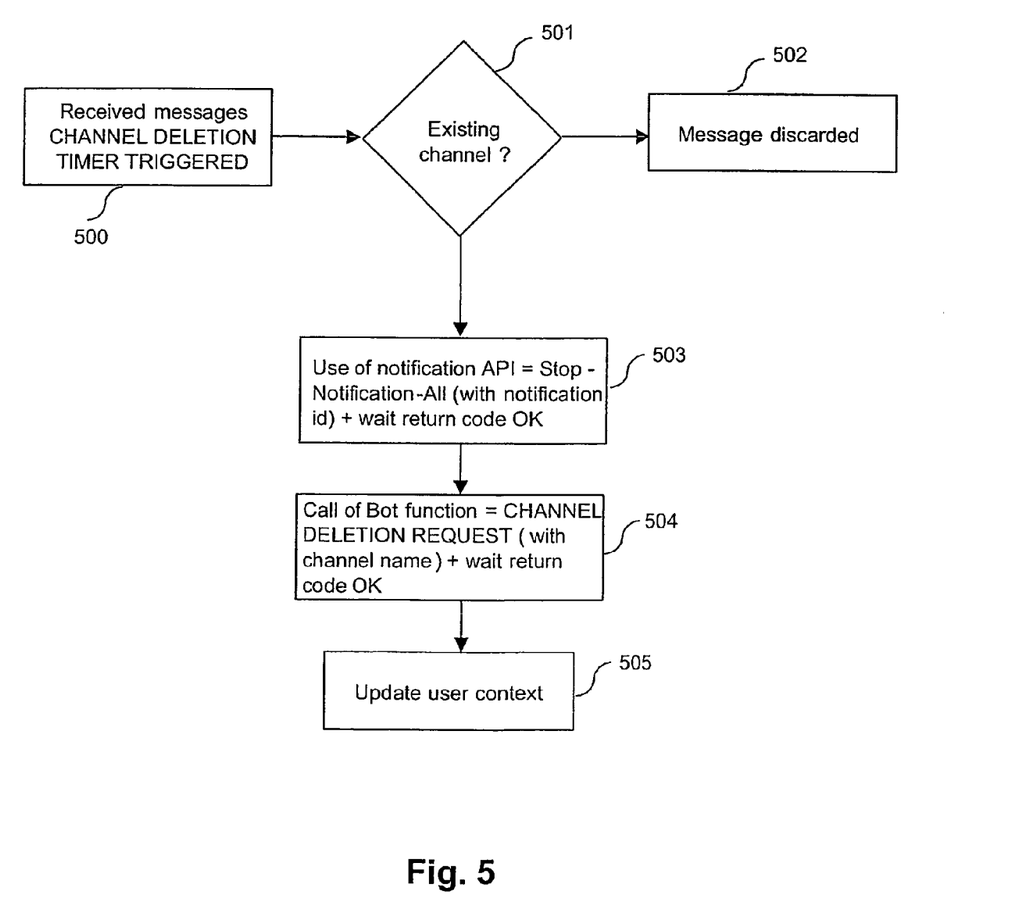
FIG. 5 shows a flow chart illustrating an operation of a scheduler according to the invention.

Once the end time for a chat room is reached, the scheduler 306 may be activated by the corresponding timer to cancel a chat room. Alternatively the scheduler 306 may receive a request for cancelling a chat room through the server 302. Referring to the flow chart in FIG. 5, the activation for a cancelling 500 leads to check if the chat room is open (501) and the request for cancelling is aborted if this is not the case (502). In case the chat room in open, at least the following steps are executed:

The scheduler communicates with the notification server (503) in order to cancel any ongoing notification process concerning the chat room.

Send a request to the Bot (504) to cancel the chat room a receive a response from the Bot to confirm the cancelling.

Update the playlist data (505).

Interface Between the Chat Manager and the Chat Server

Referring to FIG. 3 the Bot 307 is the process of the chat manager 304 which communicates with the IRC server 314. In the present embodiment the IRC server is distant from the digital television operator 301, and the communication between the Bot 35 and the IRC server is done with TCP-IP using a specific protocol called IRC protocol, which is well known in the art. The Bot 307 may also be understood as a client application which is designed specifically to create chat rooms.

The scheduler 306 sees the Bot 307 as a library of functions. The Bot 307 itself is configured to know the network IP address of the IRC server 314 and its port number, which is required to communicate.

Figure 6:
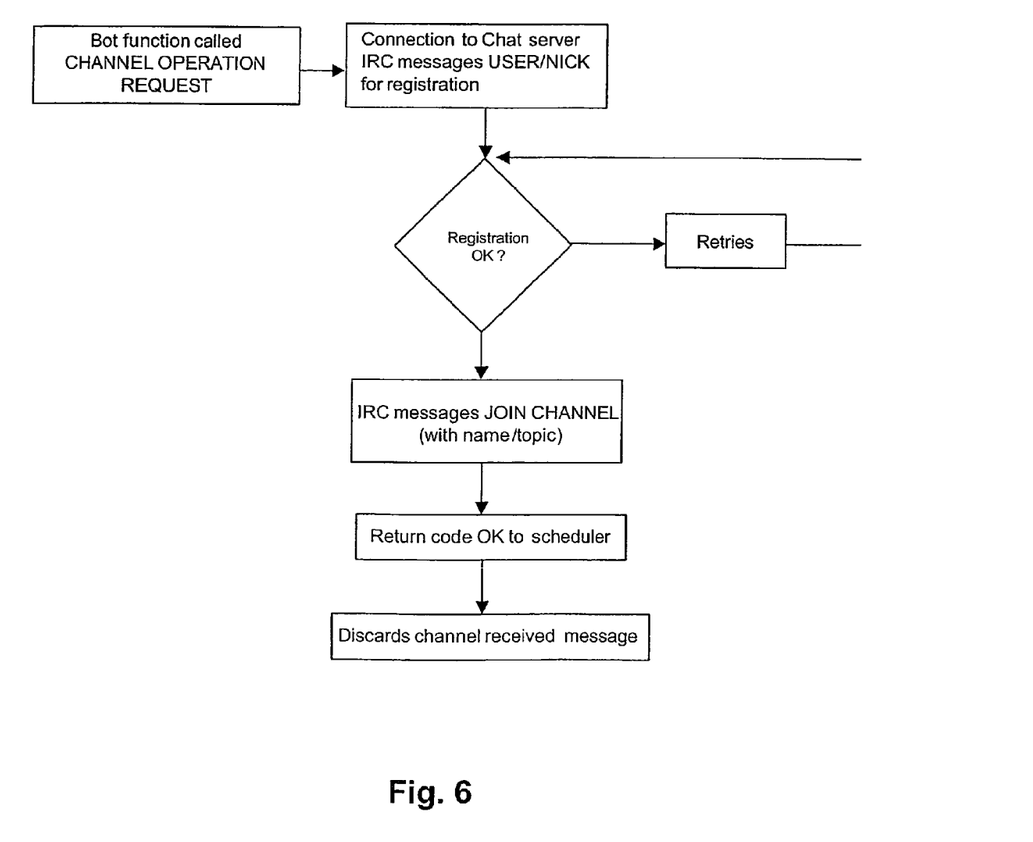
FIG. 6 shows a flow chart illustrating steps for creating a chat room according to the invention.

Hence when the scheduler sends a request for creating a chat room to the Bot 307, the Bot connects to the IRC server 314, identifies itself using its own identification, requests the server to initiate the chat room and connects to the chat room. The Bot then returns a message of confirmation to the scheduler. FIG. 6 contains a flow chart summarizing the steps executed by the Bot for creating a chat room.

After creation of the chat room, the Bot remains in charge of keeping the chat room open even if no participant connects to the chat room.

Figure 7:
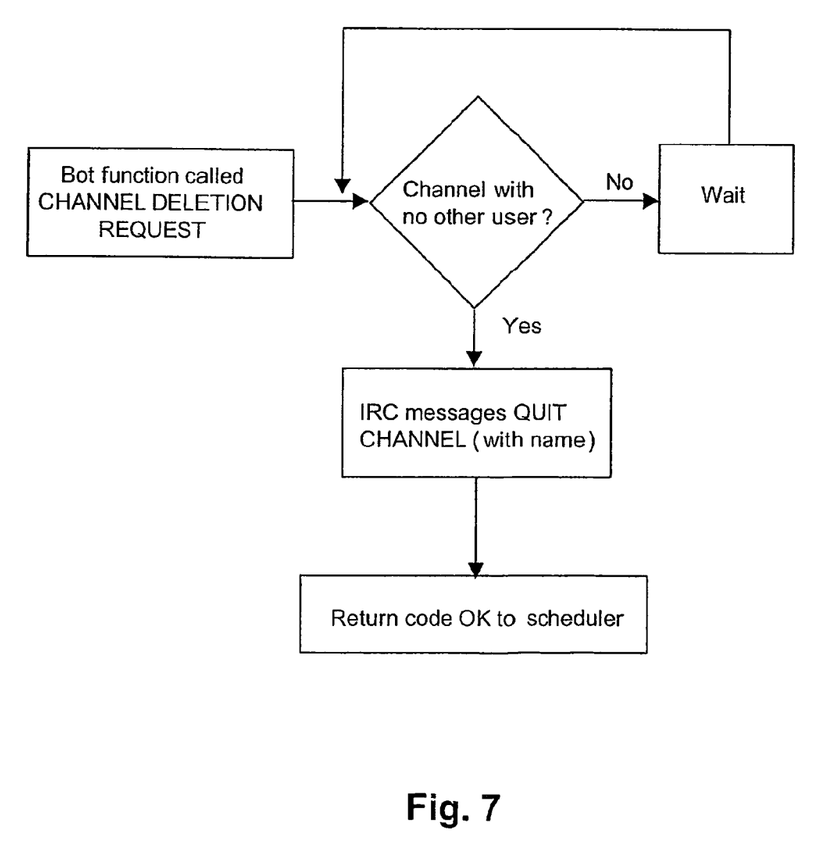
FIG. 7 shows a flow chart illustrating steps for cancelling a chat room according to the invention.

On receipt of a request to cancel a chat room from the scheduler, the Bot awaits that all participants leave the chat room before disconnecting itself from and therewith closing the chat room. After closing the chat room the Bot informs the scheduler. FIG. 7 contains a flow chart summarizing the steps executed by the Bot for cancelling a chat room.

The following is an enumeration of messages exchanged by the Bot:

Connection messages

The Bot sends the message IRC USER with its user name and the message NICK with its nickname.

Message for request of chat room creation

The Bot sends the message IRC JOIN with the name and the topic of the chat room

Message for cancelling the chat room

The Bot sends the message IRC QUIT to leave the chat room.

In order to enable the visualization of a discussion from a chat room without establishing a return link for the subscribers on the decoder side, the Bot connects to the IRC server in order to join the chat room. The Dot then receives all the messages from that chat room and stores them in a buffer memory (reference 315 in FIG. 3). Once the buffer memory is full the Bot initiates the broadcast of the buffer memory content.

Figure 8:
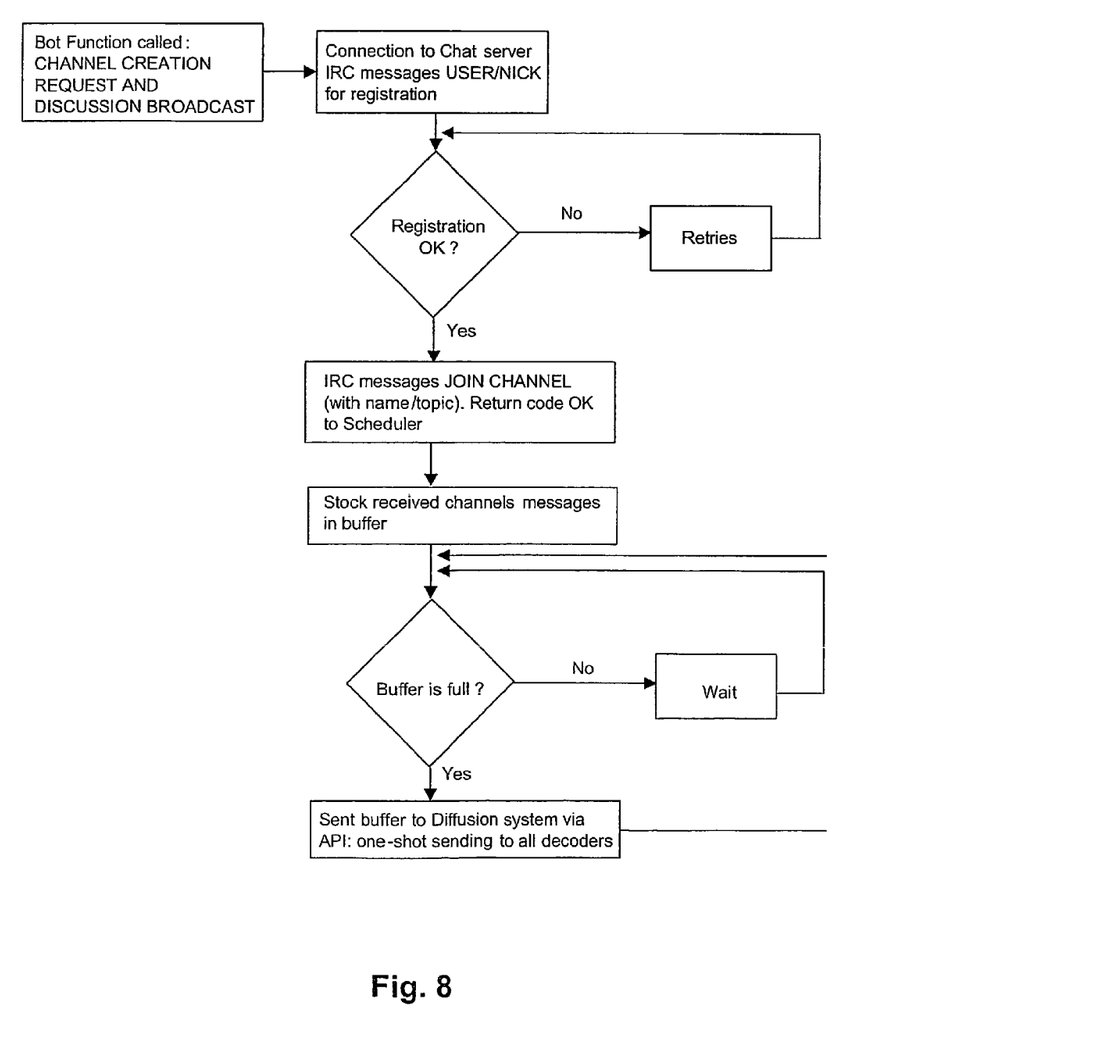
FIG. 8 shows a flow chart illustrating steps for visualizing a discussion according to the invention.

The flow chart in FIG. 8 contains a flow chart summarizing the steps executed by the Bot in order to enable visualization of a discussion for subscribers that don't want to establish a return link to the IRC server.

Interface Between the Chat Manager and the Notification Server

Referring to FIG. 3, the notification server 308 is featured with an Application Programmer Interface (API) (not shown) which is known by the scheduler 306 and allows them to communicate. In the present embodiment the communication is made in TCP-IP. The notification server has an interface to broadcast devices allowing to broadcast messages to decoders 309.

The broadcast devices comprise an MPEG section creator 310 that transmits the MPEG sections to a multiplexer 311. The multiplexer also handles sections containing audio and video at input 312. The multiplexed signal is modulated with a modulator 313 and broadcast to decoders 309.

The scheduler 306 calls the notification server function stating a request for periodic notification (Periodic_Notification_All_Request). The request includes instructions for sending the notification message to all decoders 309, indicates the periodicity of the sending and the data to be sent to the decoders, i.e., the name and the topic of the chat room, the current service to which the chat room is related.

The notification server 308 acknowledges that it has executed the request for notification by returning a notification identifier eventually stored by the scheduler.

Figure 9:
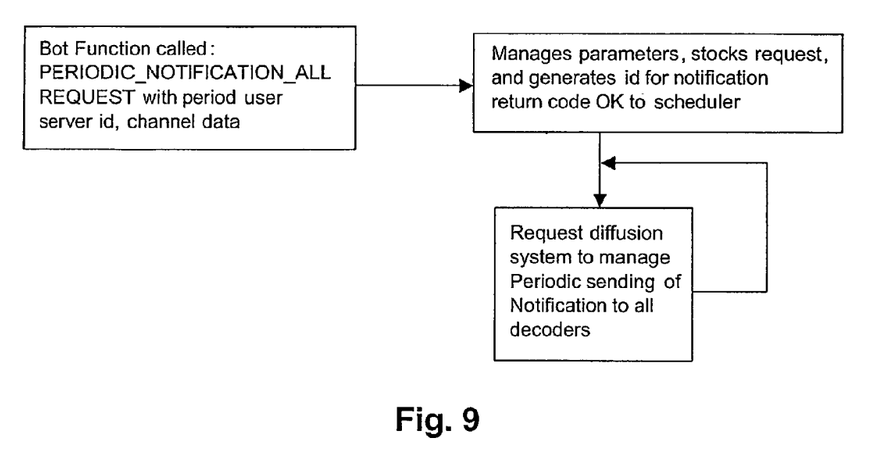
FIG. 9 shows a flow chart illustrating steps involved in notification according to the invention.

FIG. 9 contains a flow chart summarizing the steps involved in requesting a periodic notification.

In order to stop a notification, the scheduler 306 calls the notification server function stating a request for stopping periodic notification (Periodic_notification_All_Stop). The request includes the corresponding notification identifier.

The notification server 308 stops the notification and acknowledges this by returning a message to the scheduler.

Figure 10:
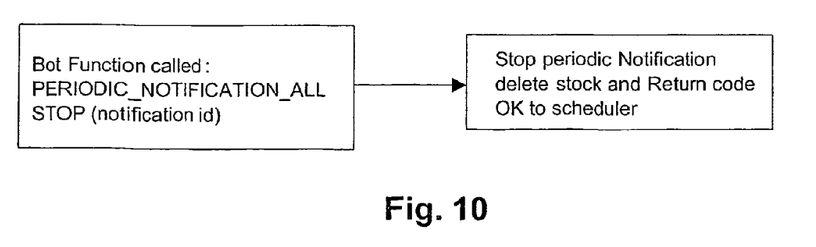
FIG. 10 shows a flow chart illustrating steps involved in notification according to the invention.

FIG. 10 contains a flow chart summarizing the steps involved in requesting a stop of notification.

While the current embodiment describes to implement a periodic notification, it would easily be adapted to produce a one shot notification instead.

The following is an enumeration of messages exchanged by the scheduler 306 with the notification server 308:

Identification and connection functions

The scheduler identifies itself with the notification server by submitting the its application name, network IP address and communication port. Subsequently a connection function is executed.

Message for requesting the transmission of a periodic notification to all decoders The scheduler calls the function Periodic_Notification_All_Request and submits its application identification, the duration of the period between two notifications transmissions, the service which it has previously retrieved from the service plan and the information concerning the new chat room. A notification identifier is returned to the scheduler.

Message for stopping notification

The scheduler calls the function Periodic_Notification_All_Stop and submits the notification identifier to stop the periodic transmissions of notification.

Disconnect

Eventually the scheduler calls a Disconnect function.

Decoder

Referring to FIG. 3, the decoder 309 comprises a notification component 317 that allows the decoder to receive the notifications from the notification server 308 if the decoder is set to receive the service related to the notification.

The decoder comprises pop-up display means (not shown in FIG. 3) which generate a display of a received notification if the decoder is set to receive the service related to the notification. The display occurs in a window that pops-up on the screen of the television. The service related to the notification generally is a television programme. Hence the subscriber watching the television programme is informed about the existence of a programme related chat room through the notification in the pop-up window.

Preferably the television programme is broadcast according to the well-known MPEG standard in which the television programme is associated to a determined value of filtering parameters. In order to display the television programme, the decoder filters received information according to the determined value of filtering parameters.

The determined value of filtering parameters is also used to decide whether a received notification needs to be displayed, i.e. to know if the notification is related to the television programme currently being watched.

The decoder further comprises display means (not shown in FIG. 3) that are used to display a discussion from a chat room on the television screen. The displayed discussion may appear at the same time as a television programme, for example in a similar way as subtitles. The display of subtitles is well known by a person skilled in the art and therefore its use in the context of a chat client application will not be explicated in more detail.

In a preferred embodiment the notification component 317 may subscribe an application to receive notifications, e.g., a chat client application 319. In this case the notification component 317 checks the information received by the decoder for notifications, extracts a corresponding notification 318 and notifies the subscribed application 319. The subscribed application then processes the notification as appropriate.

The decoder 309 may establish a return link 320 with the IRC chat server 314, e.g., by means of a modem connected to a public telephone network or by means of a cable network. The communication between the decoder and the IRC server may for example be made using TCP-IP.

The return link 320 may be used either:
as a return link only to send the chat messages issued by the subscriber to the IRC chat server, the chat room information including the discussions being broadcast to the subscriber via the head end, or
as a bi-directional link to send and receive information with the IRC chat server.

The described embodiments of the invention enable the subscriber to the following types of participation to a chat room:
Active participation: the subscriber decides to establish a return link and thereby creates an active access to the chat room discussions, during which the subscriber may interact in the discussion.
Passive participation: the subscriber receives information from a chat room discussion through broadcast in a passive access. The subscriber may not interact in the discussion since no return link is established.

Preferably the chat client application comprises switching means that allow the subscriber to switch between passive and active access at any time, by establishing the return link as appropriate.

The invention claimed is:

1. A chat manager system for administrating an event-related chat room, the chat manager comprising:
a chat room creation device which communicates with a chat server to perform creating, cancelling and joining a chat room, and
a trigger device which is programmed to activate itself at the occurrence of an event and automatically sends a request for creation of a chat room to the chat room creation device,
wherein a subscriber associated with a decoder configured to receive and display chat messages is one of a passive and an active subscriber to the chat room with functionality to switch between the passive and the active subscriber,
wherein the passive subscriber is not connected to the chat room using a return link and visualizes chat room discussions on the decoder, wherein visualizing comprises:
buffering the chat room discussions in a buffer for delayed broadcast,
formatting the chat room discussions for broadcast, when the buffer becomes full,
inserting the chat room discussions into a table for broadcast to the decoder, and
broadcasting the chat room discussions to the decoder as part of a digital bundle comprising a service related to the chat room,
wherein the active subscriber is directly connected to the chat room via a return link.

2. The chat manager system according to claim 1, further comprising:
a scheduler device to maintain a playlist of events, each event being associated to at least one event information item selected from the group consisting of:
identification of event provider,
name of event,
begin time,
end time,
name of chat room, and
topic of chat room,
the scheduler device being interfaced to the trigger device to program the trigger device according to event information of the playlist.

3. The chat manager system according to claim 2, in which the request for creation includes event information.

4. The chat manager system according to claim 1, the chat manager system further comprising:
   a notification system adapted to generate a notification signal intended to notify a potential user of the created chat room.

5. The chat manager system according to claim 1, further comprising:
   a discussion transmission device which receives chat room data from the chat server corresponding to exchanges between users connected to the created chat room, and forwards the chat room data to potential users of the created chat room.

6. A digital television operator head end system for broadcasting services to subscriber decoders, comprising a chat manager system according to claim 1.

7. The digital television operator head end system according to claim 6, further comprising:
   a broadcast device used for preparing a transmission of information to the subscriber decoders, a notification server interfaced with the chat manager to generate a notification message to be transmitted by the broadcast device, and
   a service plan device interfaced with the chat manager to provide a service number corresponding to the event, the service number being used by the notification server to generate a notification message for the concerned service only.

8. The digital television operator head end system according to claim 6, further comprising
   a programming server interfaced with the chat manager to allow remote a access for programming.

9. A chat system for a digital television network comprising the digital television operator head end system according to claim 6, and at least a decoder for receiving and decoding services broadcast by the digital television operator, the decoder comprising a chat client.

10. The chat system of claim 9, wherein the decoder further comprises:
    display means to display discussion data from a chat room on a television screen, the discussion data appearing at the same time as a determined service currently being broadcast and displayed.

11. The chat system according to claim 10, wherein the decoder further comprises:
    a pop-up display means that generates a pop-up window on the television screen, containing a notification about the creation of an event related chat room.

12. The chat system according to claim 11, wherein the decoder further comprises:
    connection means to establish a return link between the decoder and the chat server, the return link being used to send discussion data from the decoder to the chat server.

13. The chat system according to claim 12, wherein the return link is used as a bi-directional link that receives discussion data from the chat server.

14. The chat system according to claim 11, further comprising:
    MPEG filtering means for filtering the determined service among the services broadcast according to filtering parameters, wherein the filtering means is connected to the pop-up display means, and the filtering parameters are used to activate the pop-up display means when the creation of the event related chat room is related to the determined service.

15. A decoder for receiving and processing chat room data broadcast by a chat manager system according to claim 1, comprising:
    display means to display the chat room data on a television screen at the same time as a determined television programme.

16. The decoder according to claim 15, further comprising:
    a pop-up display means that generates a pop-up window on the television screen containing a notification about a creation of a chat room related to the determined television programme.

17. The decoder according to claim 15, wherein the return link is used as a bi-directional link that allows to receive chat room data from the chat server.

18. The decoder according to claim 16, further comprising:
    MPEG filtering means for filtering the determined television programme according to filtering parameters, wherein the filtering means connected to the pop-up display means, and the filtering parameters used to activate the pop-up display means when the creation of the chat room related to the determined television programme is related to the television programme currently being filtered.

19. A chat system for a digital television network comprising a digital operator head end system for broadcasting to subscriber decoders, the digital operator head end system comprising:
    a chat room creation device which communicates with a chat server to create, cancel and join an event related chat room,
    a trigger device which may be programmed to activate itself at the occurrence of an event and automatically sends a request for creation of the event related chat room to the chat room creation device,
    a broadcast device used for preparing a transmission of information to the subscriber decoders, and
    a notification server configured to generate a notification message to be transmitted by the broadcast device, wherein the notification message is related to the creation of the event related chat rooms,
    wherein a subscriber is one of a passive and an active subscriber to the chat room with functionality to switch between the passive and the active subscriber,
    wherein the passive subscriber is not connected to the chat room using a return link and visualizes chat room discussions on the decoder, wherein visualizing comprises:
        buffering the chat room discussions in a buffer for delayed broadcast,
        formatting the chat room discussions for broadcast, when the buffer becomes full,
        inserting the chat room discussions into a table for broadcast to the decoder, and
        broadcasting the chat room discussions to the decoder as part of a digital bundle comprising a service related to the chat room,
    wherein the active subscriber is directly connected to the chat room via a return link.

20. The chat system according to claim 19, further comprising:
    a scheduler device to maintain a playlist of events, each event being associated to at least one event information item selected from the group consisting of:
        identification of event provider, name of event, begin time, end time, name of chat room, and topic of chat room,
    the scheduler device being interfaced to the trigger device to program the trigger device according to event information of the playlist.

21. The chat system according to claim 20, in which at least an event is related to a television programme, the chat system further comprising:

a service plan device configured to provide a service number corresponding to a service on which the television programme is broadcast to the subscribers, wherein the service number is used by the notification server to generate a notification message for only the service.

22. A method for administrating event related chat rooms in a digital television network comprising:

maintaining a playlist of events and related information, and automatically requesting a chat server to create an event related chat room on occurrence of an event of the playlist, wherein a subscriber associated with a decoder configured to receive and display chat messages is one of a passive and an active subscriber to the chat room with functionality to switch between the passive and the active subscriber, wherein the passive subscriber is not connected to the chat room using a return link and visualizes chat room discussions on the decoder, wherein visualizing comprises:

buffering the chat room discussions in a buffer for delayed broadcast, formatting the chat room discussions for broadcast, when the buffer becomes full, inserting the chat room discussions into a table for broadcast to the decoder, and broadcasting the chat room discussions to the decoder as part of a digital bundle comprising a service related to the chat room, wherein the active subscriber is directly connected to the chat room via a return link.

23. The method according to claim 22 further comprising:

receiving information to be broadcast from a content provider, detecting in the information to be broadcast a determined information corresponding to an event of the playlist, and automatically requesting a chat server to create an event related chat room upon detecting the determined information.

24. The method according to claim 22 further comprising:

notifying potential users of a newly created event related chat room about its creation.

25. The method according to claim 24 further comprising:

relating an event with a television programme, identifying a service number used to broadcast the television programme in the television network, and using the service number to notify potential users.

26. The method according to claim 22 further comprising:

providing passive access to at least one of a plurality of chat rooms for subscribers in a digital television network, by gathering chat room data related to the chat room from a chat server on which the chat room is opened, and broadcasting the gathered chat room data to the subscribers.

* * * * *

UNITED STATES PATENT AND TRADEMARK OFFICE
CERTIFICATE OF CORRECTION

PATENT NO.        : 7,743,096 B2                                    Page 1 of 1
APPLICATION NO.   : 10/511772
DATED             : June 22, 2010
INVENTOR(S)       : Helene Bouilloux-Lafont et al.

It is certified that error appears in the above-identified patent and that said Letters Patent is hereby corrected as shown below:

Title Page

Under item (75) Inventors, the first three Inventor's addresses appear incorrect. The first Inventor's address appears as "c/o Thompson Licensing S.A., 46 Quai A. Le Gallo, 92100 Boulogne-Billancourt (FR)" and should read --c/o Thomson Licensing S.A., 46 Quai A. Le Gallo, 92100 Boulogne-Billancourt (FR)--. The second Inventor's address appears as "c/o Thompson Licensing S.A., 46 Quai A. Le Gallo, 92100 Boulogne-Billancourt (FR)" and should read --c/o Thomson Licensing S.A., 46 Quai A. Le Gallo, 92100 Boulogne-Billancourt (FR)--. The third Inventor's address appears as "c/o Thompson Licensing S.A., 46 Quai A. Le Gallo, 92100 Boulogne-Billancourt (FR)" and should read --c/o Thomson Licensing S.A., 46 Quai A. Le Gallo, 92100 Boulogne-Billancourt (FR)--.

Signed and Sealed this

Thirty-first Day of August, 2010

David J. Kappos
*Director of the United States Patent and Trademark Office*